United States Patent [19]
Ueki

[11] Patent Number: 5,875,557
[45] Date of Patent: Mar. 2, 1999

[54] SCALE

[76] Inventor: Katsumi Ueki, 2-17-26 Teraokita, Ayase, Kanagawa-Ken, Japan

[21] Appl. No.: 825,054

[22] Filed: Mar. 27, 1997

[51] Int. Cl.⁶ ....................................................... B43L 7/00
[52] U.S. Cl. ................................................ 33/494; 33/476
[58] Field of Search ............................. 33/494, 476, 483, 33/491

[56] References Cited

U.S. PATENT DOCUMENTS

| | | | |
|---|---|---|---|
| 1,497,492 | 6/1924 | Engel | 33/494 |
| 1,778,922 | 10/1930 | Tait et al. | 33/476 |
| 3,250,010 | 5/1966 | Smith | 33/494 |
| 4,134,213 | 1/1979 | Kushmuk | 33/512 |
| 4,301,596 | 11/1981 | Sedlock | 33/494 |

FOREIGN PATENT DOCUMENTS

| | | | |
|---|---|---|---|
| 3007370 | 7/1987 | Japan . | |
| 1585762 | 3/1981 | United Kingdom | 33/494 |

*Primary Examiner*—Diego Gutierrez
*Assistant Examiner*—Andrew Hirshfeld
*Attorney, Agent, or Firm*—Nikaido Marmelstein Murray & Oram, LLP

[57] ABSTRACT

Disclosed is a scale so marked with centimeters and inches that inch-and-foot marks are made on the basis of the correct metric set of marks to be recurrently in alignment with selected metric marks at every spatial period, Thus, the exact linear measurement is permitted according to the metric system, and at the same time, the approximate inch-and-foot linear determination is permitted readily by sight.

4 Claims, 4 Drawing Sheets

SCALE

BACKGROUND OF THE INVENTION

1. Field of the Invention

The present invention relates to a scale having two sets of numbers at exactly fixed distance apart for measuring things, and more particularly to a measuring instrument marked with a metric scale and a inch-and-foot scale for the sake of facilitating the conversion from one to the other. In the general tendency of transition to the metric system such a scale is useful in inducing workers who are still measuring things in terms of inches and feet in the architectual fields to get used to the metric system.

2. Prior Arts

Scales are widely used for measuring the lengths of different things not only in architectural works but also in homeworks. The scale is the most primitive one of all the tools used in architectural works.

A variety of scales such as a architect's scale, an engineer's scale or module are used. The word, "scale" used herein after should be understood as including every sort of scale actually used for measuring the lengths of things.

As is well known, different measuring systems are used in the world. For instance, in America and other countries things are measured in terms of inch and foot. This is especially so in building wooden houses and big buildings. There is, however, an active movement for world-wide standardization of linear measurement. In the TAG8 international standardization of linear measurement in architecture, the metric system is adopted as measure of length, one meter being equal to one hundred millimeters (1M=100 mm). Thus, it has been popular that scales marked with inches are additionally marked with centimeters. Such scales have two sets of marks parallel arranged with the proportion of 1 foot to 304.8 millimeters, and 1 inch to 25.4 millimeters in marking.

Thus, one can find the corresponding number of metric system from given number of feet or inches on the scale. This sort of scale, however, is designed in principle for linear measurement in terms of feet or inches, permiting conversion to the metric system only when occasions demand. Use of such scales makes for the continuous use of inches and feet in measuring things in architectural fields, making it difficult to use the metric system alone no matter how long a period workers may use and get used to such scales. As a matter of fact, it is very difficult to induce them to get used to the metric system so far as such scales are used; they are actually used as the inch-and-foot scale.

Also, when given lengths determined in terms of inch and foot are converted to corresponding metric measurement, required calculations must be effected by using a conversion rate, which is given decimally (for instance, with the aid of desk calculators). No matter how far the conversion rate may be decimally determined, the conversion rate itself contains more or less errors, and therefore, conversion into the metric system will ineviably cause some errors.

The above description is directed to conversion of inches or feet into centimeters and meters. This is also the case with "SUN" and "SHAKU", which are used as units in linear measurement in Japan. The inventor invented a scale facilitating conversion of "SUN" or "SHAKU" into the metric system, and filed a utility model application on Jul. 15, 1986 in Japan. The application was registered as Utility Model Registration No. 3,007,370.

The conversion rate is determined so that 1 "SHAKU" may be equal to 33+($\frac{1}{3}$) centimeters for the purpose described later, and a set of marks are made on the basis of 1 "SHAKU" for every ten "SUN"s on the surface of long instrument. This is not correct from the mathematical point of view. Such apparent equality between the two different measuring systems, however, has the effect of putting selected marks in alignment in different measuring systems, giving still permissible approximation in conversion from the metric measurement to "SUN"- or "SHAKU". Workers realize that measurement based on centimeters and meters is correct, and therefore, they will be led to use of metric system when they get used to such scales.

As a matter of course such scales cannot be applied directly to conversion of inch or foot into centimeter or meter; the measuring system using "SUN" or "SHAKU" as units of length is totally different from the measuring system using inch or foot as units of length.

SUMMARY OF THE INVENTION

The first object of the present invention is to provide a scale which is useful in inducing people who have habitually used inches and feet in measuring the lengths of things to get used to measurement in terms of centimeters and meters without experiencing difficulties.

The second object of the present invention is to provide a scale permitting reduction of the values of length given in terms of inches and feet to the correct metric expression with ease.

To attain the first object of the present invention a scale is marked with true centimeters and meters, and at the same time, marked with "apparent" inches and feet with the proportion of 4 feet to 1200 millimeters. Stated otherwise, selected marks of "apparent" inches and feet appear at exact recurrence rate to meet corresponding true metric marks on the surface of the scale. Such "apparent" inches and feet on the surface of the scale can provide approximate measurement permissible for actual use.

To attain the second object of the present invention the scale is marked with correct numbers of centimeters, and the mark indicating 12 inches or 1 foot is made in alignment with the mark indicating 30 centimeters, and so on on the surface of the scale. Such marking is made in consideration of the wide use of inch and foot as the unit of length; the approximate conversion rate of 12 inches or 1 foot to 30 centimeters is popularly used.

The present invention can be applied to ordinary scales or rules used in architectual fields or offices, and applied to any other scales or rules marked with inches and feet, and at the same time, millimeters, centimeters and meters. The scale can be made of metal, synthetic resin, bamboo, wood, paper, cloth or any other material which can be marked.

The scale has two sets of marks, one indicating true centimeters and meters and the other indicating "apparent" inches and feet. Selected marks of different measuring systems are put in alignment with each other recurrently at predetermined distances. This recurrent alignment in both measuring systems facilitates the conversion therebetween, compared with the scale whose set of different marks indicate true inches and feet and true centimeters and meters respectively, which have none of marks of both measuring systems to meet in alignment. The aligning of selected marks in both measuring systems has the effect of facilitating the required conversion from one to the other measuring system by sight.

BRIEF DESCRIPTION OF THE DRAWINGS

Other objects and advantages of the present invention will be understood from the following description of scales according to some preferred embodiments of the present invention, which are shown in accompanying drawings, in which.

DETAILED DESCRIPTION OF THE INVENTION

Figure 1:
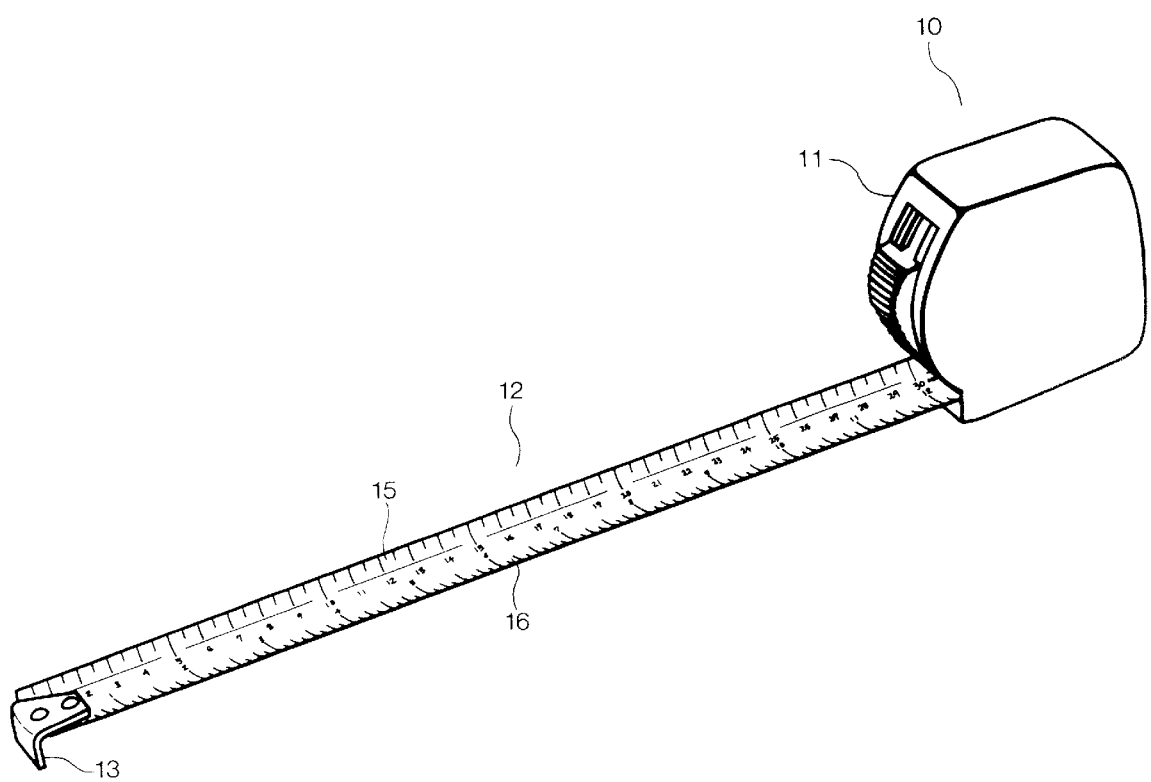
FIG. 1 is a perspective view of a tape measure according to a first embodiment.

Referring to FIG. 1, a tape measure according to the first embodiment 10 comprises a flat, cylindrical casing 11 and a band of narrow bendable material 12 in the form of long tape, which can be rewound and wound on itself in the casing 11. The band 12 may be made of bendable steel, and has an end hook 13 fixed to its end. The mark at the end hook 13 indicates "0".

Figure 2:
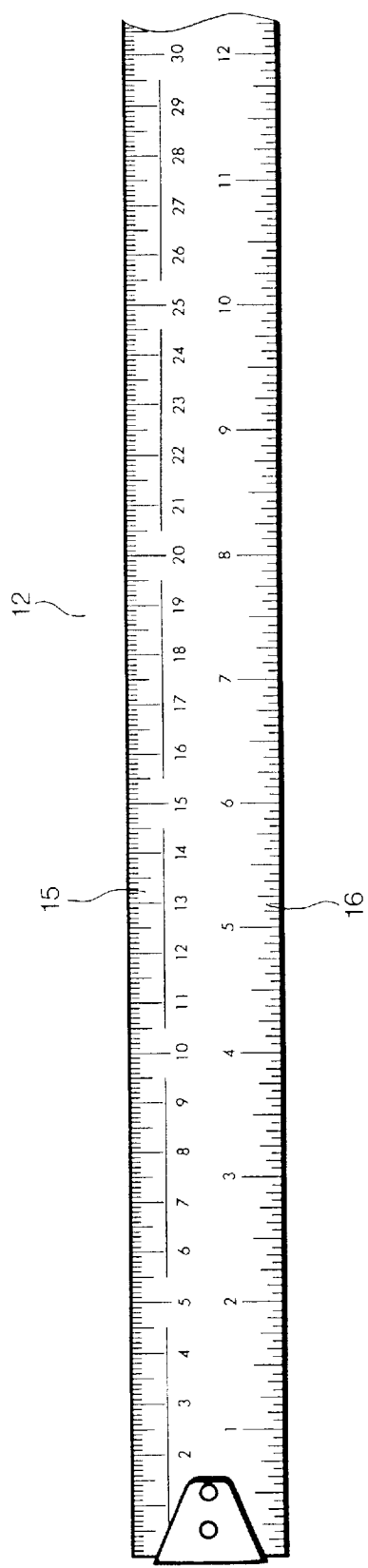
FIG. 2 is a plane view of the tape measure, showing a fragment of the tape at an enlarged scale.

As seen from FIG. 2, the band 12 has a set of marks 15 on one side, indicating numbers according to the metric system, and another set of marks 16 on the other side, indicating numbers according to the inch-and-foot system. The set of marks 15 indicate true or correct numbers according to the metric system. The other set of marks 16 are made on the basis of:

---
1 foot = 30 centimeters
     = 12 inches
---

Specifically, a 30 centimeter length of the metric set of marks (the span from Mark "0" to Mark "30") is divided into 12, and each division is marked with inch.

Ordinarily 1 inch is equal to 25.4 millimeters, and accordingly 1 foot (=12 inches) is determined as equal to 25.4×12 millimeters, that is 30.48 centimeters. The idea of the present invention resides in: the exact linear measurement can be given in the metric system, and the approximate linear measurement can be given in terms of inches and feet.

Assume that a desk is measured with the tape measure 10. The desk is found to be 1 meter and 10 centimeters (110 centimeters) long, and at the same time, found to be 3.7 feet long (approximately). The exact conversion using the conversion rate of 25.4 millimeters to 1 inch (304.8 millimeters to 1 foot) will produce the value of 3.74 feet whereas the approximate conversion using the less correct conversion rate of 300 millimeters to 1 foot will produce the value of 3.67 feet. This difference, however, has little or no significance, realizing that the correct linear measurement is given according to the metric system.

The use of the less correct conversion rate of 300 millimeters to 1 foot in the tape measure 10 permits the alligning of Mark 30 (centimeters) with Mark 12 (inches), thereby permitting one to understand the relation between the two different linear measuring systems quickly by sight. Those who use such tape measures are kept conscious of the exactness in metric measurement and of the approximation in another measuring system, thus inducing them to use the metric measurement in the hope of determining the exact length, and thus getting used to the metric measurement. The additional set of "inch"-and-"foot" marks has the effect of making for the possible quickest transition to the metric system. This may be realized by supposing that use of a scale marked with centimeters and inches both permitting correct linear measurements induces workers to use perpetually the familiar "inch"-and-"foot" marks rather than unfamiliar metric marks.

Incidentally, 4 feet (1219.2 millimeters) are used often as the unit of length in the architectual field in America. In the tape measure 10 which is marked with the 1 foot-to-30 centimeter proportion according to the present invention the 4 feet long unit corresponds to 1200 millimeters, thus making it easy to grasp the approximate value in conversion from one to the other linear measuring system.

Figure 3:
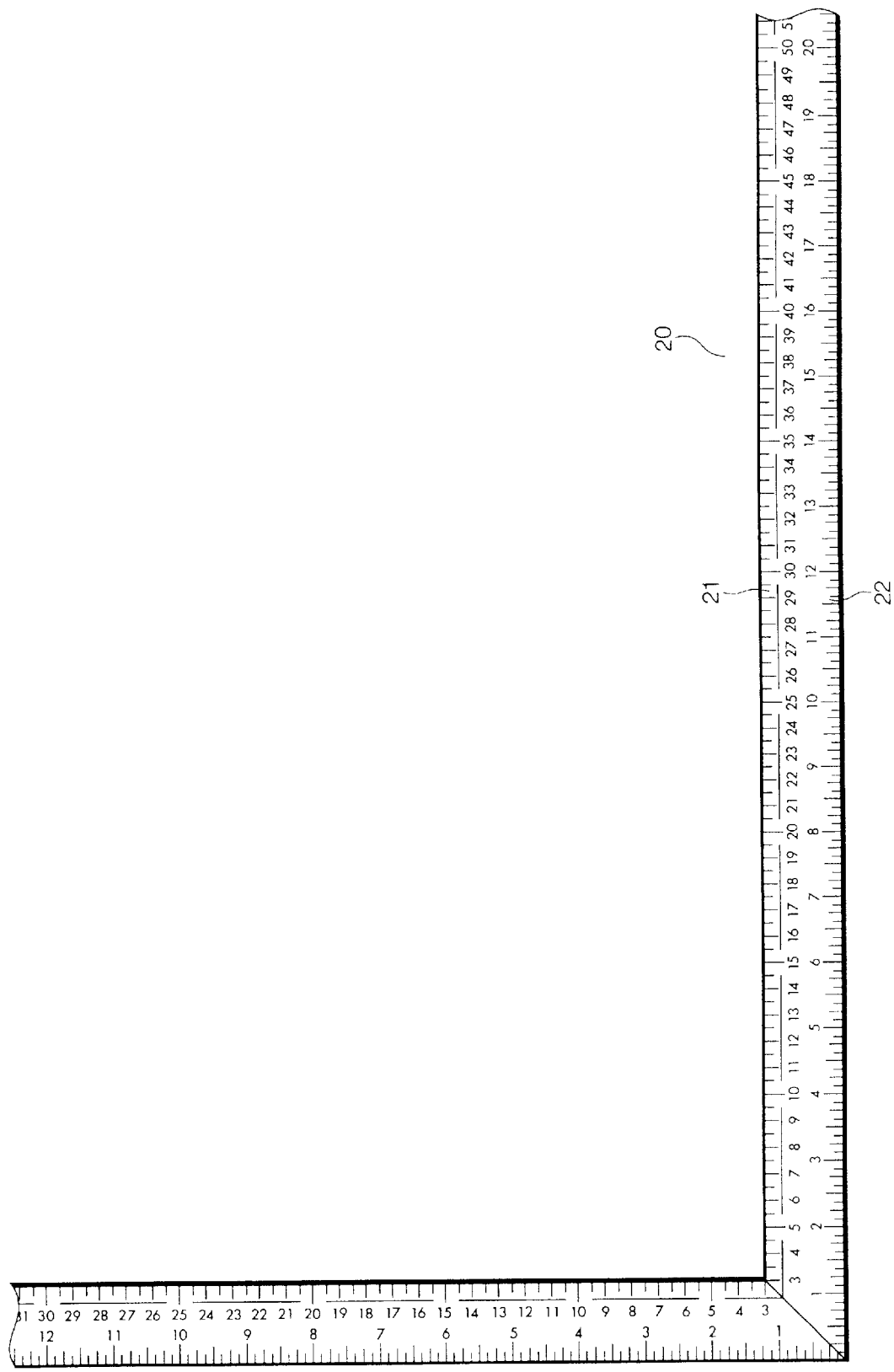
FIG. 3 is a plane view of a carpenter's square according to a second embodiment.

Referring to FIG. 3, a carpenter's square 20 is marked with centimeters and inches in the same manner as the tape measure described above, and therefore, it has the same sets of marks as shown in FIG. 2. Specifically in FIG. 3, a first set of marks 21 is of metric system, and a second set of marks 22 is made by dividing every 30 centimeter-long distance into 12 divisions, each corresponding to 1 inch.

Figure 4:
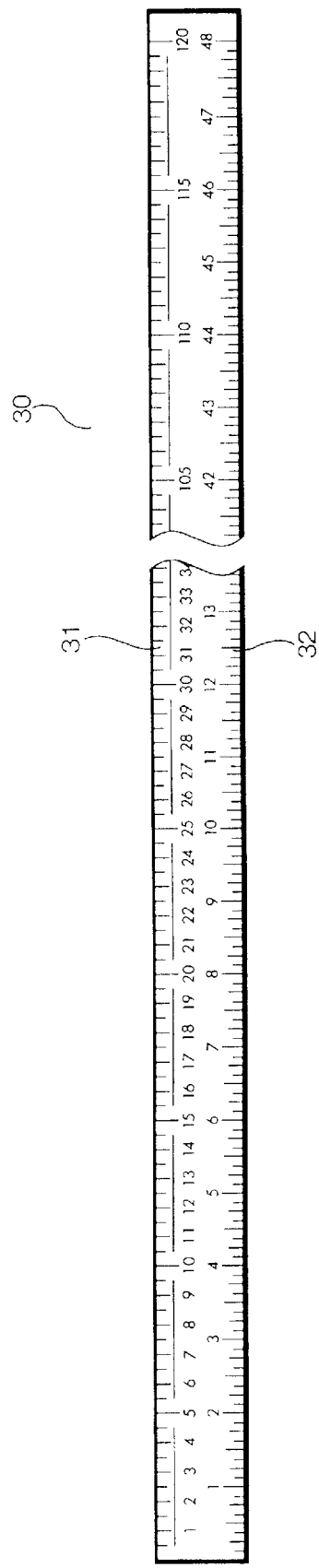
FIG. 4 is a plane view of a straight rule according to a third embodiment.

Referring to FIG. 4, a straight rule 30 is marked with centimeters on one side, and with inches on the other side, similar to FIG. 2. Specifically in FIG. 4, a first set of marks 31 is of metric system, and a second set of marks 32 is made on the basis of the first set of marks 31 by dividing every 30 centimeter-long distance into 12 divisions, each corresponding to 1 inch.

What is claimed is:

1. A ruled scale having a top face with a first edge marked in centimeters and a second edge marked in approximate inches comprising:

a first set of marks disposed along said first edge at first equal intervals of one millimeter;

a second set of marks disposed along said second edge at second equal intervals of almost one inch, wherein 48 of said second intervals is equal to exactly 1200 millimeters.

2. A ruled scale according to claim 1 further comprising a plurality of third marks disposed uniformly between each of said first marks and a plurality of fourth marks disposed uniformly between each of said second marks.

3. A ruled scale having a top face with a first edge marked in centimeters and a second edge marked in approximate inches comprising:

a first set of marks disposed along said first edge at first equal intervals of one centimeter;

a second set of marks disposed along said second edge at second equal intervals of almost one inch, wherein 12 of said second intervals is equal to exactly 30 centimeters.

4. A ruled scale according to claim 3 further comprising a plurality of third marks disposed uniformly between each of said first marks and a plurality of fourth marks disposed uniformly between each of said second marks.

* * * * *